L. REST.
CHICKEN VERMIN TRAP.
APPLICATION FILED MAY 10, 1917.
1,233,703.
Patented July 17, 1917.
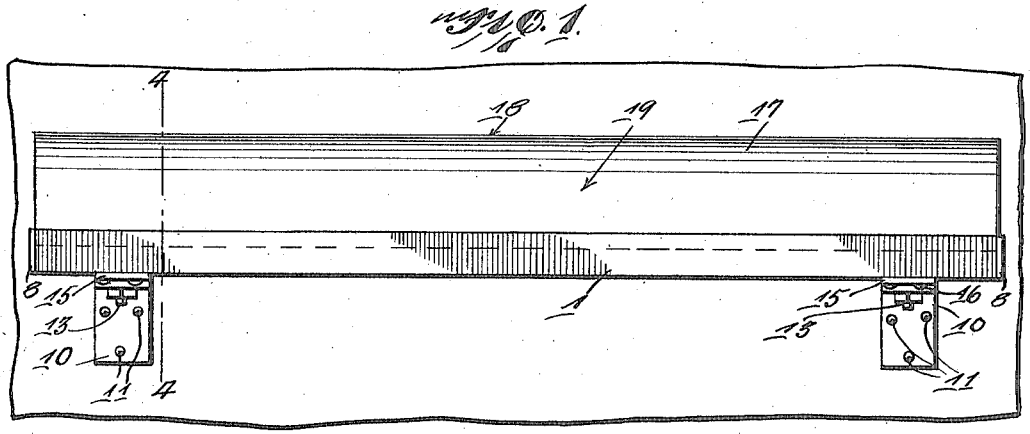
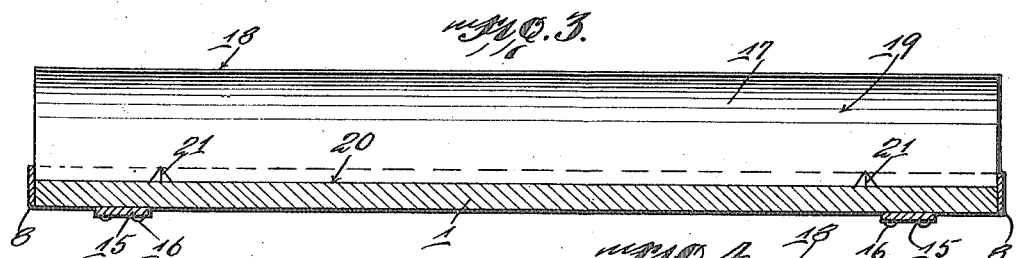
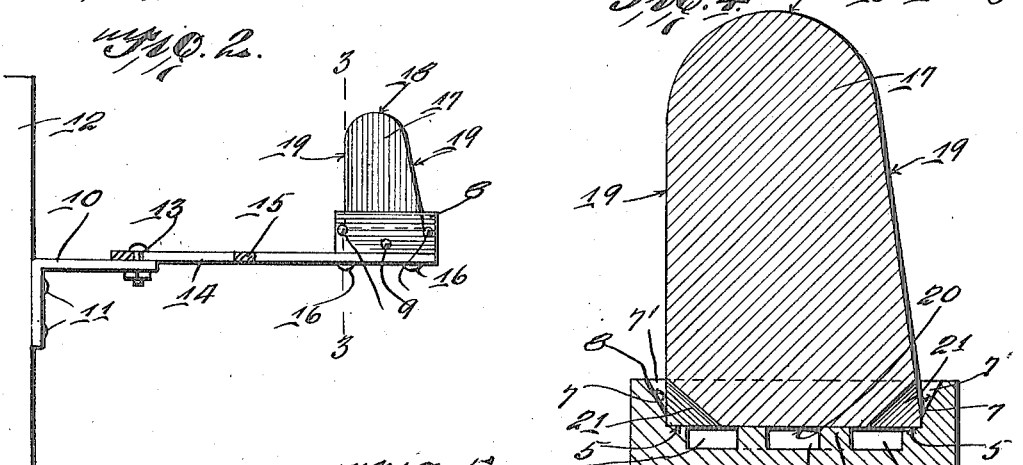
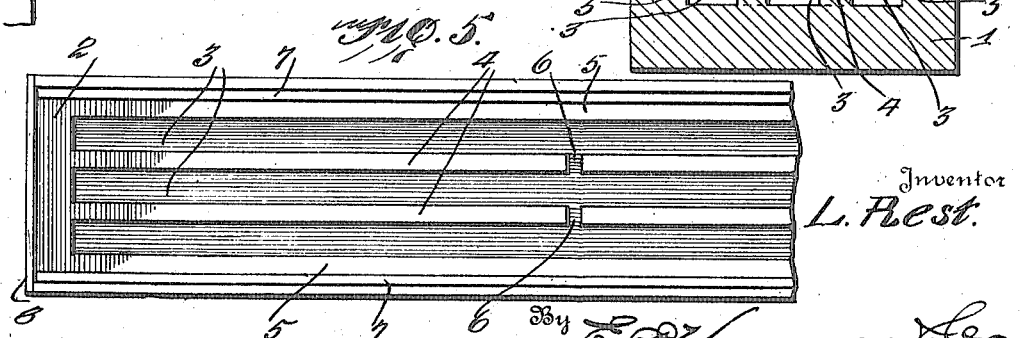
Inventor
L. Rest.

UNITED STATES PATENT OFFICE.

LEO REST, OF BALTIMORE, MARYLAND.

CHICKEN-VERMIN TRAP.

1,233,703.　　　　　Specification of Letters Patent.　　Patented July 17, 1917.

Application filed May 10, 1917. Serial No. 167,743.

*To all whom it may concern:*

Be it known that I, LEO REST, a citizen of the United States of America, residing at Baltimore, in the State of Maryland, have invented certain new and useful Improvements in Chicken-Vermin Traps, of which the following is a specification, reference being had therein to the accompanying drawing.

This invention relates to a chicken vermin trap and has for its principal object the production of a structure which is arranged so as to trap the mites adjacent the lower portion of the perch in such a way as to prevent the mites from being freed.

Another object of this invention is the production of a chicken vermin trap which is constructed so as to provide a base upon the lower portion of the perch, this base being provided with a plurality of grooves while the perch is provided with notches, thereby allowing the vermin or mites to pass through the notches into the grooves and become trapped within the base, thus preventing the mites from again leaving the base and infesting the poultry upon the perch.

With these and other objects in view, this invention consists in general of certain novel combinations, constructions and arrangements of parts as will be hereinafter fully described and claimed.

In the accompanying drawings:

Figure 1 is a side elevation of the chicken vermin trap showing the same carried upon a support.

Fig. 2 is an end elevation of the chicken vermin trap, illustrating how the same may be adjustably supported.

Fig. 3 is a longitudinal sectional view through the trap taken on the line 3—3, Fig. 2.

Fig. 4 is a transverse vertical sectional view through the trap taken on the line 4—4, Fig. 1.

Fig. 5 is a top plan view of the base.

Referring to the accompanying drawings by numerals, it will be seen that the base 1 is elongated and is substantially rectangular in cross section, as shown in Fig. 4. This base 1 is provided with a sunken pocket 2 extending throughout its entire length, while the grooves 3 extend longitudinally of the base as illustrated clearly in Fig. 5. These grooves 3 are sunken below the inner surface of the pocket 2, thereby forming dividing ribs 4 within the base, while side supporting shelves 5 are also constituted in parallel spaced relation with respect to each other. It will be noted, however, that the ribs 4 are provided with central notches 6 which constitute passageways between the grooves 3. The base 1 is further provided with beveled inclined side walls 7 extending throughout its entire length and adjacent its upper portion, whereby these inclined walls communicate with the top of the base and project at points adjacent the side shelves 5 as shown in Fig. 4. The sheet metal ends 8 are secured by the rivets or other securing members 9 upon the ends of the base 1 so as to close these ends, as illustrated clearly in Figs. 2 and 5.

The angle bracket 10 is secured as indicated at 11 to a support 12, and this angle bracket 10 is adapted to carry a bolt 13 extending through a slot 14 formed in a supporting arm 15. The outer end of this arm 15 is mounted upon the lower surface of the base 1, as shown at 16, for fixedly supporting the base upon the bracket. As a consequence, it will be noted that the bracket 10 and arm 15 will constitute a support for retaining the trap in an adjusted set position with respect to a support. It is, of course, obvious that as many of these brackets and arms may be employed as may be necessary for the support of one trap, as illustrated in Fig. 1. It is further obvious that various forms of supports may be provided for the support of the trap without departing from the spirit of the invention, and that the trap and perch may be of any desired length.

The perch 17 is provided with a rounded top periphery 18 having smooth side walls 19 thereby allowing the feet of the poultry to firmly grip the perch when the poultry rest thereon. This perch 19 is provided with a flat lower surface 20 which extends in a substantially horizontal plane when the perch is positioned upon the base of the trap. The perch 17 is provided with notches 21 formed therein and communicating with its sides and its even lower surface 20 as shown clearly in Fig. 3. Therefore, it will be noted that the notches 21 extend from points adjacent the inclined upper points adjacent the inclined walls 7 and communicate with the grooves 3 formed in the base 1.

When this chicken vermin trap is in use, the base 1 is secured to the arm 15 as hereinbefore described and the arm is in turn secured to the bracket 10. The perch 17 is positioned upon the base so as to have its even lower surface 20 rest upon the shelves 5 and the ribs 4 while by having the slanting walls 7 extending away from the sides 19 of the perch 17, it will be seen that channel-like portions will be formed adjacent the lower portions of the perch as shown clearly in Fig. 4. It will further be noted that the perch 17 will be held against longitudinal displacement from the base, while the ends of the channel portions 7' will be closed by the provision of the sheet metal or end plates 8.

As is well known, the vermin or mites which infest poultry generally rest upon the poultry during the hours of dark although when light appears, the vermin or mites if given a chance will leave the poultry and will crawl down to secluded or dark corners, or under the perch upon which the poultry are resting. By the provision of this trap, the vermin when passing down the even sides 19 of the perch 17 will be directed into the channels 7', and as is the tendency of the vermin or mites, they will continue to crawl to the lower portions of the channels rather than creeping up the inclined side walls 7. After the vermin or mites are in the lowest portions of the channels 7' they will then pass longitudinally along these channels until finding the notches 21 formed in the lower portions of the perch 17, they will pass into the outer grooves 3. Of course, if the vermin happen to pass toward the ends of the base upon coming into engagement with the end plates 8, they will turn and pass back toward the notches which will then be in their path of travel. After the vermin have passed into the grooves upon seeking further secluded and dark places, they will pass through the passages 6 into the inner grooves between the ribs 4 where they will stay. By this construction it will be seen that a trap is provided into which the vermin or mites will be easily directed, although it will be impossible for the mites to find their way out to the outer portions of the base when they so desire. In this way it is obvious that in a comparatively short time the mites will die, and it is necessary to remove the perch at frequent intervals to cleanse the interior of the trap.

From the foregoing description it will be seen that a chicken vermin trap has been produced of a minimum number of parts which has notches, grooves and passageways so arranged as to trap the vermin or mites and prevent their repassing to the outer portions of the perch while the trap is operated independently of chemicals, or other expensive solutions for destroying the vermin inasmuch as after the vermin have passed into the grooves, they will finally starve to death and, as a consequence, may be easily removed when the trap is being cleansed.

What is claimed is:—

1. In a trap of the class described, the combination of a base, means for supporting said base, said base having a countersunk pocket, a perch extending into said pocket, whereby said perch will be held against accidental displacement, said perch having a plurality of notches, said base having a plurality of grooves, said notches communicating with said grooves whereby vermin passing through the lower portions of said perch will pass through said notches into said grooves and thus be trapped.

2. In a trap of the class described, the combination of a base, means for supporting said base, said base having a countersunk pocket, said base having grooves formed therein, a perch positioned upon said base and extending into said pocket whereby said perch will be held against accidental displacement, said perch having notches formed therein and communicating with said grooves, said base having inclined interior side walls thereby forming channel portions adjacent the base of said perch whereby mites or vermin passing to the lower portions of said perch will pass into said channel portions and will then be directed to the notches, and said notches will then direct the vermin or mites into said grooves.

3. In a trap of the class described, the combination of a base, means for supporting said base, said base having a counter-sunk pocket thereby forming side supporting shelves, said base having interior slanting side walls, said base having spaced grooves formed therein, thereby providing upstanding spaced ribs, said ribs having passageways formed intermediate their ends, a perch having a comparatively even lower portion fitting upon said shelves and said ribs, thereby covering said grooves, said perch having notches formed therein and communicating with said channel portions and with said grooves whereby vermin or mites passing downwardly upon said perch will be directed into said channel portions and will then be directed through said notches into said grooves and said passageways permitting the mites to pass into the inner grooves so as to be positively trapped.

In testimony whereof I hereunto affix my signature.

LEO REST.

Copies of this patent may be obtained for five cents each, by addressing the "Commissioner of Patents, Washington, D. C."